(12) United States Patent
Bae et al.

(10) Patent No.: US 8,724,761 B2
(45) Date of Patent: May 13, 2014

(54) SYMBOL SYNCHRONIZATION APPARATUS AND METHOD OF PASSIVE RFID READER

(75) Inventors: Ji Hoon Bae, Daejeon (KR); Dong Han Lee, Daejeon (KR); Kwang Soo Cho, Daejeon (KR); Won Kyu Choi, Daejeon (KR); Man Sik Park, Daejeon (KR); Chan Won Park, Daejeon (KR); Cheng Hao Quan, Daejeon (KR); Gil Young Choi, Daejeon (KR); Jong Suk Chae, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 417 days.

(21) Appl. No.: 12/832,914

(22) Filed: Jul. 8, 2010

(65) Prior Publication Data

US 2011/0096883 A1    Apr. 28, 2011

(30) Foreign Application Priority Data

Oct. 28, 2009  (KR) .................. 10-2009-0102930

(51) Int. Cl.
*H04L 7/02* (2006.01)
(52) U.S. Cl.
USPC ............................................. 375/359
(58) Field of Classification Search
USPC ............. 340/10.1, 572.1; 368/118, 120; 370/350; 375/242, 341, 333, 354, 359, 375/360, 376; 455/502
See application file for complete search history.

(56) References Cited

U.S. PATENT DOCUMENTS

| 6,618,459 | B1 * | 9/2003 | Tada ........................... 375/376 |
| 8,023,594 | B1 * | 9/2011 | Li et al. ........................ 375/340 |
| 2006/0115003 | A1 * | 6/2006 | Kari et al. ................. 375/242 |
| 2010/0061490 | A1 * | 3/2010 | Noeldner .................. 375/341 |

FOREIGN PATENT DOCUMENTS

| KR | 10-2002-0036546 A | 5/2002 |
| KR | 10-2009-0044155 A | 5/2009 |
| KR | 10-2009-0044348 A | 5/2009 |
| KR | 10-2009-0058439 A | 6/2009 |

* cited by examiner

*Primary Examiner* — Sam K Ahn
*Assistant Examiner* — Shawkat M Ali

(57) ABSTRACT

Provided is a symbol synchronization apparatus and method of a passive RFID reader. The symbol synchronization apparatus includes: an edge clock detector generating edge clocks by detecting phase inversion positions of a received signal; a preamble detector detecting a preamble section by analyzing the generation times of the edge clocks; a symbol decision time extractor extracting a symbol decision time by averaging distances between the edge clocks consecutively generated in the preamble section, when the preamble section is detected; and a symbol decider deciding a symbol by analyzing the magnitude of the received signal, when the time reaches the symbol decision time.

13 Claims, 10 Drawing Sheets

SYMBOL SYNCHRONIZATION APPARATUS AND METHOD OF PASSIVE RFID READER

CROSS-REFERENCE TO RELATED APPLICATIONS

This application claims the priority of Korean Patent Application No. 10-2009-0102930 filed on Oct. 28, 2009, in the Korean Intellectual Property Office, the disclosure of which is incorporated herein by reference.

BACKGROUND OF THE INVENTION

1. Field of the Invention

The present invention relates to a symbol synchronization apparatus and method of a passive radio frequency identification (RFID) reader, which demodulates a tag signal received under a passive RFID environment, and more particularly, to a symbol synchronization apparatus and method of a passive RFID reader, which reliably performs symbol synchronization on a tag signal distorted by transmission energy components and a subcarrier-type tag signal.

2. Description of the Related Art

In general, the RFID technology refers to a technology which reads or writes information from or into a tag with unique identification information in a non-contact manner using a wireless frequency such that an article, an animal, or a person with the tag may be recognized, traced, and managed.

An RFID system includes a plurality of tags or transponders having unique identification information and attached to articles or animals, and an RFID reader or interrogator reading or writing information from or to the tags.

Such an RFID system may be divided into a mutual induction type and an electromagnetic wave type, depending on the mutual communication scheme between the reader and the tags, into an active type and a passive type depending on whether the tags operate with their own power or not, or into a long wavelength type, a medium wavelength type, a short wavelength type, and an ultra-short wavelength type depending on a frequency used by the system.

While receiving a tag signal, the RFID reader communicating with a passive RFID tag should continuously supply transmission energy to the passive RFID tag. Therefore, when the transmission/reception isolation is not sufficiently secured, a large amount of transmission energy leaks into a receiver stage of the RFID reader.

The transmission energy leaking into the receiver stage may cause some data to be lost at or around a section in which the preamble of a received signal starts, and may cause DC-offset noise.

In the receiver stage of the RFID reader which performs general symbol synchronization, it is difficult to accurately synchronize tag signals distorted by such a transmission leakage signal. In particular, since a local peak signal is generated during a matched filter output for a subcarrier-type tag signal, it is not easy to achieve a symbol timing lock.

FIGS. 1A and 1B show a matched filter output for a subcarrier signal (M=2) with a low frequency (LF) of 640 kHz. FIG. 1A is a graph showing the signal level of a symbol 1, and FIG. 1B is a graph showing the signal level of a symbol 0. Referring to FIGS. 1A and 1B, it can be seen that a matched filtering signal of the subcarrier signal contains a local peak signal as well as a peak value indicating a symbol.

FIG. 2 illustrates preamble signals for a subcarrier signal which are described in the ISO 18000-6C standard (UHF Gen2 protocol standard). FIG. 3 shows an example of a subcarrier signal distorted by a transmission leakage signal.

Referring to FIG. 2, when M=2 in the subcarrier signal, two unit pulse signals (bit data) are implemented as one symbol. When M=4, four unit pulse signals (bit data) are implemented as one symbol. When M=8, eight unit pulse signals (bit data) are implemented as one symbol.

A preamble signal includes 4M/LF data in which an identical unit pulse pattern is repeated and '010111' data.

As shown in FIG. 3, however, the start data of the tag signal (that is, the 4M/LF data of the preamble signal) may be partially distorted or lost by a transmission leakage signal under the passive RFID environment.

As described above, the start data of the tag signal may be partially distorted or lost by the transmission leakage signal under the passive RFID environment, and the matched filtering signal for the subcarrier signal has a local peak signal. Therefore, it is not easy to accurately extract and set up a symbol decision time.

SUMMARY OF THE INVENTION

An aspect of the present invention provides a symbol synchronization apparatus and method of a passive RFID reader, which accurately catch a symbol decision start time even though distortion noise caused by a transmission leakage signal or the like is contained in a tag signal.

Another aspect of the present invention provides a symbol synchronization apparatus and method of a passive RFID reader, which adaptively tracks a symbol decision start time which may change at any time depending on an operation environment of the passive RFID, thereby increasing the reliability of symbol synchronization.

According to another aspect of the present invention, there is provided a symbol synchronization apparatus and method of a passive RFID reader including: an edge clock detector generating edge clocks by detecting phase inversion positions of a received signal; a preamble detector detecting a preamble section by analyzing the generation times of the edge clocks; a symbol decision time extractor extracting a symbol decision time by averaging distances between the edge clocks consecutively generated in the preamble section, when the preamble section is detected; and a symbol decider deciding a symbol by analyzing the magnitude of the received signal, when the time reaches the symbol decision time.

The received signal may include a symbol 0 matched filtering signal and a symbol 1 matched filtering signal.

The edge clock detector may include: a subtractor outputting a difference signal between the symbol 0 matched filtering signal and the symbol 1 matched filtering signal contained in the received signal; a low-pass filter filtering the output signal of the subtractor to output a first edge signal; a level decider comparing the first edge signal with a reference level to output a second edge signal; and an edge information extractor detecting the phase inversion positions of the second edge signal to output the edge clocks.

The edge information extractor may detect a position at which the slope of the second edge signal changes from positive to negative, and generate an edge clock at the position.

The preamble detector may calculate distances between the consecutive edge clocks through the edge clock detector, detect the occurrence of the preamble section when the distances coincide with distances between symbols 1 of 010111 data within the preamble signal, and generate a preamble activation signal and a symbol decision start signal.

The symbol decision time extractor may include: an initial symbol decision time extractor extracting an initial symbol decision time by averaging the distances between the consecutive edge clocks generated in the preamble section, when the preamble activation signal is inputted; and a symbol decision time detector setting the initial symbol decision time to the symbol decision time, when the symbol decision start signal is inputted, and then continuously detecting and compensating for an error of the symbol decision time.

The initial symbol decision time extractor may extract the initial symbol decision time in accordance with an expression of $T_{on\_time}=(2MT'_b+MT'_b+MT'_b)/4=MT'_b$, where $T_{on\_time}$ represents the initial symbol decision time, M represents the number of unit pulses composing a unit symbol in a subcarrier signal, $T'_b$ represents the length of the unit pulse, $2MT'_b$ represents a distance between the first and second edge clocks among the four consecutive edge clocks, and $MT'_b$, represents a distance between the second and third edge clocks or the third and fourth edge clocks.

The symbol decision time detector may detect a time difference between the symbol decision time and the maximum point of the received signal within a preset time window section, and compensate for the symbol decision time by adding or subtracting the detected time difference.

The symbol decider may decide a symbol by comparing the magnitudes of the symbol 0 matched filtering signal and the symbol 1 matched filtering signal contained in the received signal, when the time reaches the symbol decision time.

According to another aspect of the present invention, there is provided a symbol synchronization method of a passive RPID reader including: generating edge clocks by detecting phase inversion positions of a received signal; detecting a preamble section by analyzing the generation times of the edge clocks; when the preamble section is detected, extracting a symbol decision time by averaging distances between the consecutive edge clocks generated in the preamble section; and when the time reaches the symbol decision time, deciding a symbol by analyzing the magnitude of the received signal.

The received signal may include a symbol 0 matched filtering signal and a symbol 1 matched filtering signal.

The generating of the edge clocks may include: outputting a difference signal between the symbol 0 matched filtering signal and the symbol 1 matched filtering signal contained in the received signal; generating a first edge signal by filtering the difference signal, and generating a second edge signal by comparing the first edge signal with a reference level; and generating the edge clocks by detecting the phase inversion positions of the second edge signal.

The generating of the edge clocks by detecting the phase inversion positions of the second edge signal may include: receiving the second edge signal; calculating a difference between the received second edge signal and a second edge signal preceded by a unit time and a difference between the receive second edge signal and a second edge signal delayed by the unit time; and generating the edge clocks, when the difference between the received second edge signal and the second edge signal preceded by the unit time is equal to or smaller than zero and the difference between the receive second edge signal and the second edge signal delayed by the unit time is larger than zero.

In the detecting of the preamble section, the distances between the consecutive edge may be calculated, and when the distances coincides with the distances between the symbols 1 contained in the preamble section, the section may be determined to be the preamble section.

The extracting of the symbol decision time may include: extracting an initial symbol decision time by averaging the distances between the consecutive edge clocks generated in the preamble section; and setting the initial symbol decision time to the symbol decision time.

The extracting of the symbol decision time may further include detecting a time difference between the symbol decision time and the maximum point of the received signal within a preset time window section, and compensating for the symbol decision time by adding or subtracting the detected time difference.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
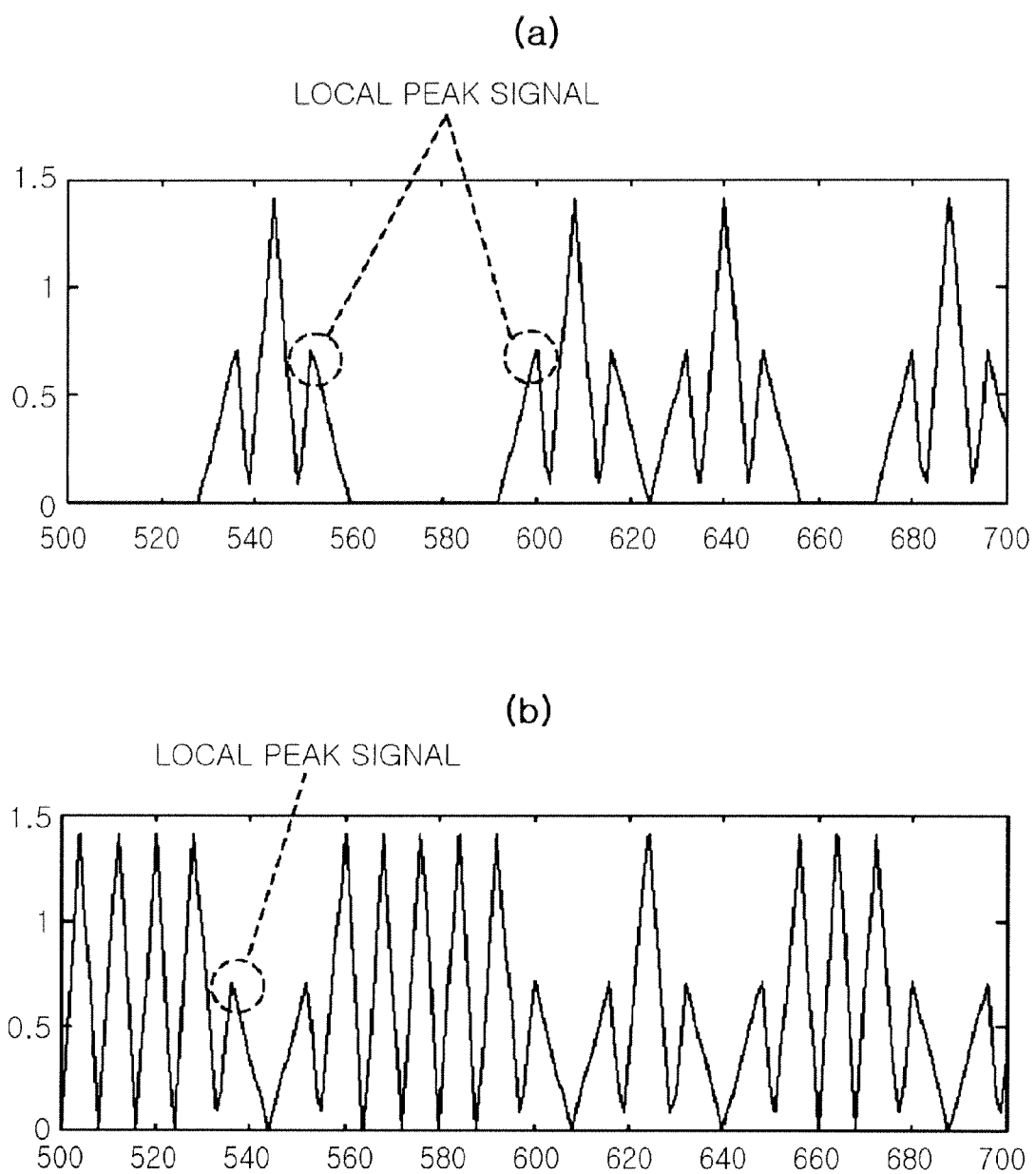
FIGS. 1A and 1B show a matched filter output for a subcarrier signal (M=2) with an LF of 640 kHz.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

In exemplary embodiments of the present invention, useful edge information of a preamble signal contained in a subcarrier signal is extracted to perform symbol synchronization. Accordingly, it is possible to accurately extract a symbol decision time in any environment such that a symbol may be decided.

That is, the symbol synchronization is performed by using the edge information which may be acquired from the '010111' data section of the preamble signal. Therefore, although the 4M/LF data of the preamble signal is partially distorted or lost by the external environment, the symbol decision time is normally extracted to decide a symbol.

Figure 4:
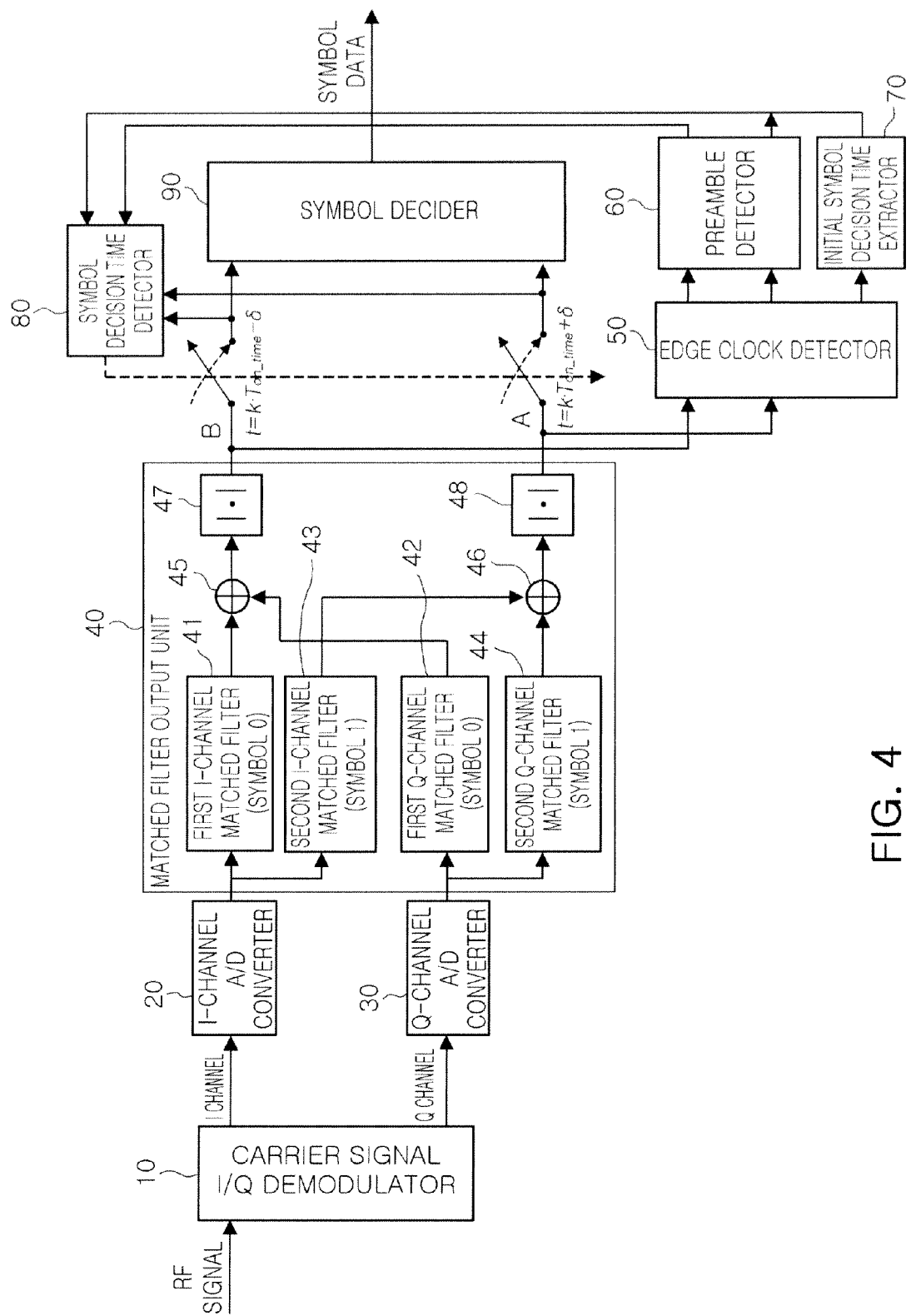
FIG. 4 is a configuration diagram of a symbol synchronization apparatus of a passive RFID reader according to an embodiment of the present invention.

FIG. 4 is a configuration diagram of a symbol synchronization apparatus of a passive RFID reader according to an embodiment of the present invention.

Referring to FIG. 4, the symbol synchronization apparatus of the passive RFID reader according to the embodiment of the present invention includes a carrier signal I/Q demodulator 10, I- and Q-channel A/D converters 20 and 30, a matched filter output unit 40, an edge clock detector 50, a preamble detector 60, an initial symbol decision time extractor 70, a symbol decision time detector 80, and a symbol decider 90.

Hereinafter, the functions of the respective components will be described in detail.

The carrier signal I/Q demodulator 10 is configured to demodulate I/Q channel analog signals of a subcarrier signal which is transmitted from an RFID tag and received through an antenna. The I-channel A/D converter 20 is configured to quantize the I-channel analog signal into a digital signal, and the Q-channel A/D converter 30 is configured to quantize the Q-channel analog signal into a digital signal. The carrier signal I/Q demodulator 10 and the I- and Q-channel A/D converters 20 and 30 are general components of which the operations are well-known. Therefore, detailed descriptions thereof will be omitted in the embodiment of the present invention.

The matched filter output unit 40 includes first I- and Q-channel matched filters 41 and 42, second I- and Q-channel matched filter 43 and 44, first and second adders 45 and 46, and first and second absolute value calculators 47 and 48, and is configured to matched-filter the quantized I/Q signals to generate a symbol 0 matched filtering signal A and a symbol 1 matched filtering signal. B.

In order for that, the first I- and Q-channel matched filters 41 and 42 filter a signal having the same form as the symbol 0 from the subcarrier signal, the second I- and Q-channel matched filters 43 and 44 filter a signal having the same form as the symbol 1 in the subcarrier signal, the first adder 45 adds the output signals of the first I- and Q-channel matched filters 41 and 42, the second adder 46 adds the output signals of the second I- and Q-channel matched filters 43 and 44, and the first and second absolute value calculators 47 and 48 calculate the absolute values for the output signals of the first and second adders 45 and 46.

The output signal B of the first absolute value calculator 47 is the symbol 0 matched filtering signal, and has a signal form as shown in FIG. 1B. The output signal A of the second absolute value calculator 48 is the symbol 1 matched filtering signal1, and has a signal form as shown in FIG. 1A.

The symbol 0 matched filtering signal A and the symbol 1 matched filtering signal B are inputted to the edge clock detector 50 and the symbol decision time detector 80, in order to extract a symbol decision time. Furthermore, the symbol 0 matched filtering signal A and the symbol 1 matched filtering signal B are inputted to the symbol decider 90 so as to be used as signals for deciding symbol data.

Figure 5:
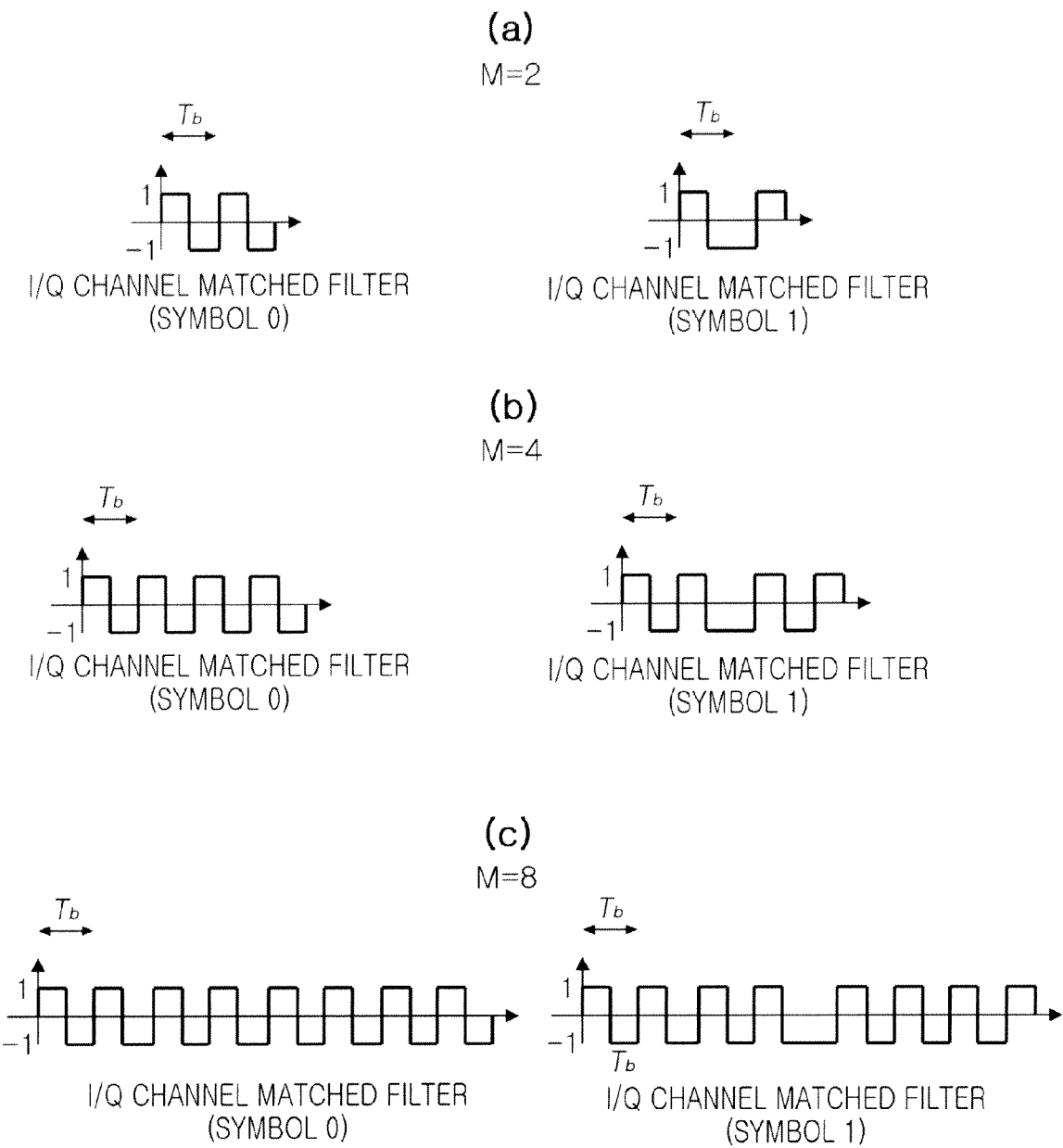
FIG. 5 illustrates signal forms of I- and Q-channel matched filters of the symbol synchronization apparatus of the passive RFID reader according to the embodiment of the present invention.

At this time, the forms of the signals matched-filtered by the first I- and Q-channel filters 41 and 42 and the second I- and Q-channel filters 43 and 44 are selected and applied depending on M values of the subcarrier signal, as shown in FIG. 5.

Figure 2:
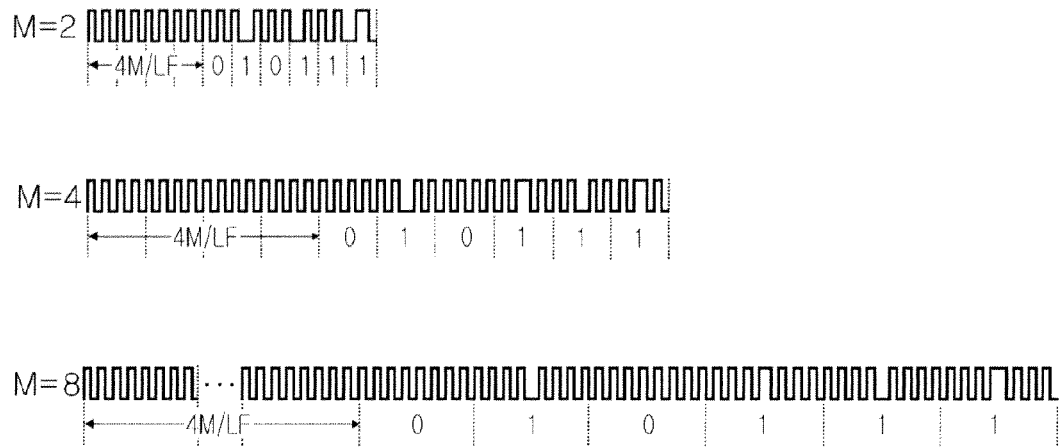
FIG. 2 illustrates preamble signals for a subcarrier signal which are described in the ISO 18000-6C standard (UHF Gen2 protocol standard)
Figure 3:
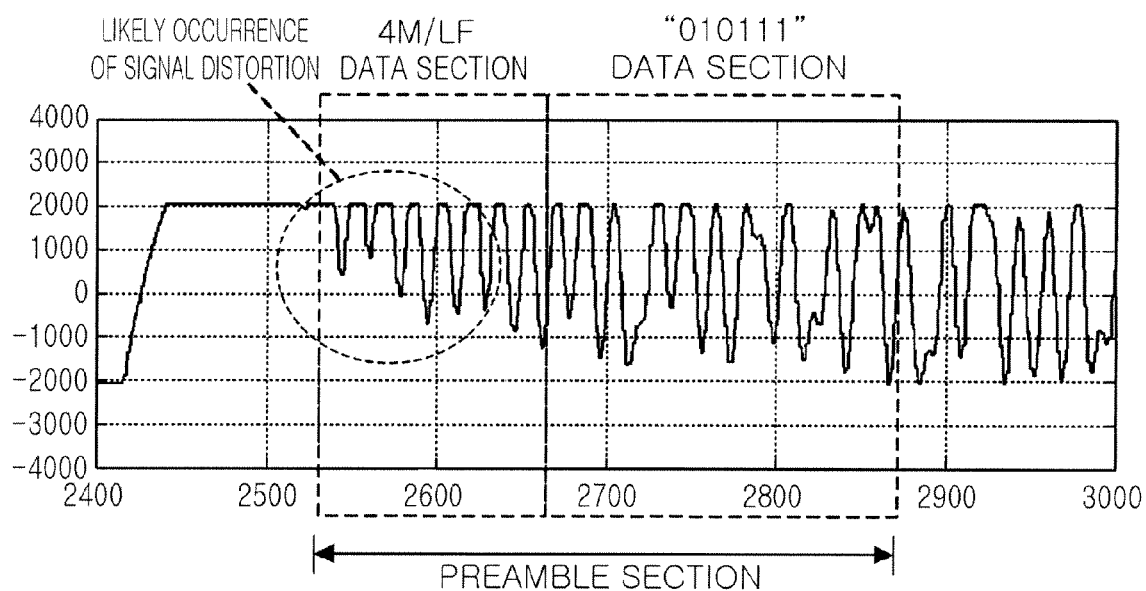
FIG. 3 shows an example of a subcarrier signal distorted by a transmission leakage signal.
Figure 6:
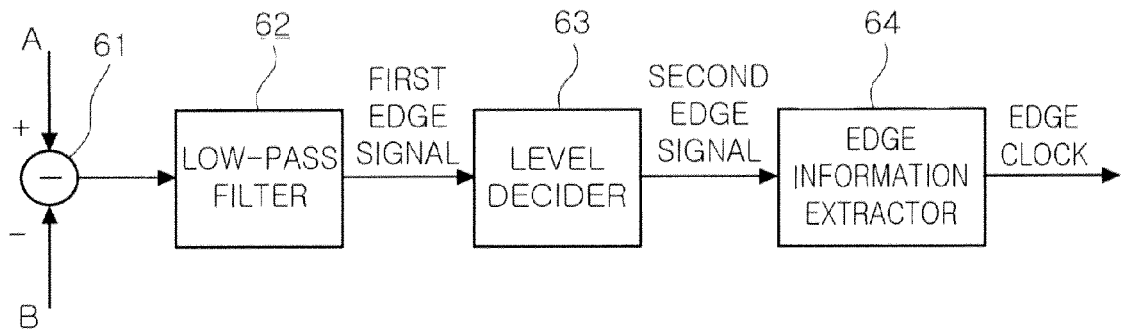
FIG. 6 is a block diagram illustrating the detailed configuration of an edge clock detector according to the embodiment of the present invention.

Referring to FIG. 6, the edge clock detector 50 includes a subtractor 61, a low-pass filter 62, a level decider 63, and an edge information extractor 64. The edge clock detector 50 is configured to detect phase inversion positions and generate edge clocks, using the symbol 0 matched filtering signal A and the symbol 1 matched filtering signal B. Therefore, it is possible to detect the '010111' data section of a preamble signal having a useful edge information as shown in FIG. 2.

In this case, the subtractor 61 calculates a difference signal between the symbol 0 matched filtering signal A and the symbol 1 matched filtering signal B, the low-pass filter 62 filters the difference signal to output a first edge signal, and the level decider 63 compares the first edge signal with a reference level. When the first edge signal is larger than the reference level, the level decider 63 outputs the first edge signal as it is. When the first edge signal is smaller than the reference level, the level decider 63 outputs a second edge signal which is to be converted into zero. At this time, as the signal smaller than the reference level is outputted as zero by the level decider 63, it is possible to remove low-level noise contained in the first edge signal. The edge information extractor 64 operates in accordance with an algorithm shown in FIG. 9, and extracts the edge information of the second edge signal to generate an edge clock.

Figure 7:
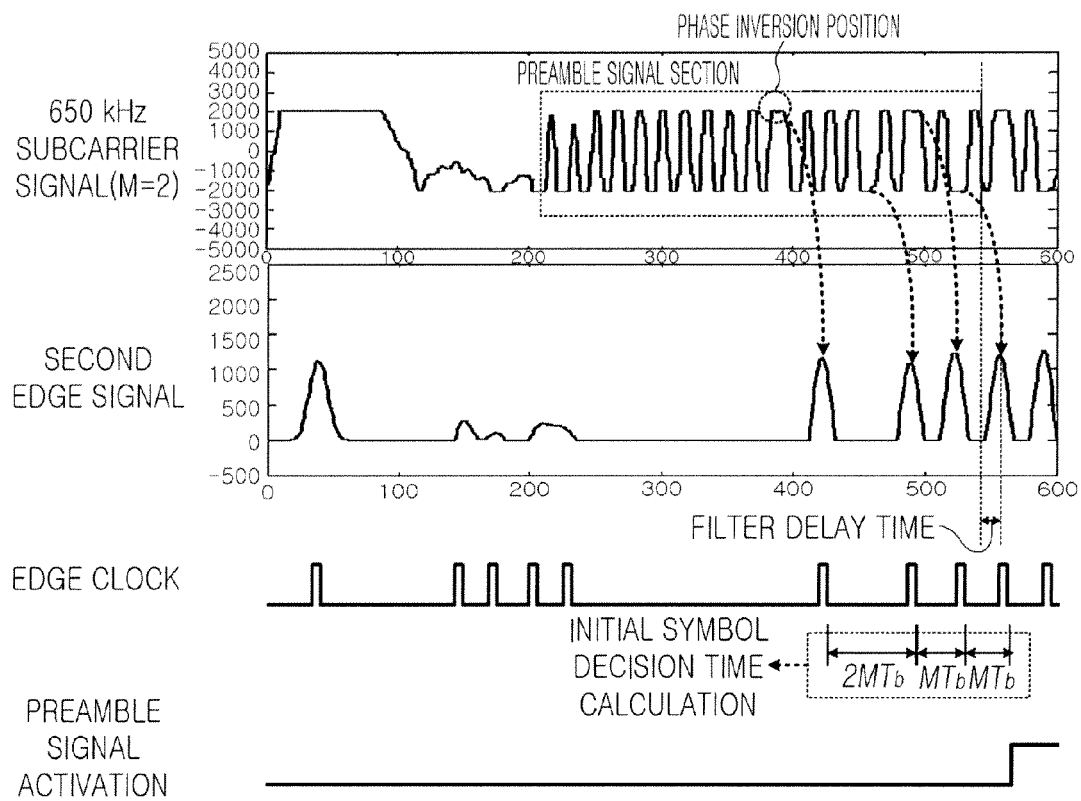
FIG. 7 shows waveforms of a second edge signal and edge clocks which are generated by the edge clock detector of FIG. 6, when a 640 kHz subcarrier signal of which the M value is 2 is applied.

FIG. 7 shows waveforms of a second edge signal and edge clocks which are generated by the edge clock detector 50 when a 640 kHz subcarrier signal of which the M value is 2 is applied.

Referring to FIG. 7, it can be seen that the edge clocks are generated so as to correspond to positions at which the phase inversion of the subcarrier signal occurs. The edge information extractor 64 generates edge clocks indicating the phase inversion positions of the second edge signal, that is, the edge information of the second edge signal. The edge clock is generated at a maximum point of the second edge signal by such a method that searches for a position where the slope of the second edge signal changes from a positive value to a negative value. When the phase inversion of the subcarrier signal occurs whenever the symbol 1 is inputted in the '010111' data section of the preamble signal, the edge information extractor 64 detects the phase inversion to generate an edge clock at each phase inversion position.

The preamble detector 60 is configured to analyze the generation time of the edge clock to detect the preamble section, and generate a preamble activation signal and a symbol decision start signal.

Figure 10:
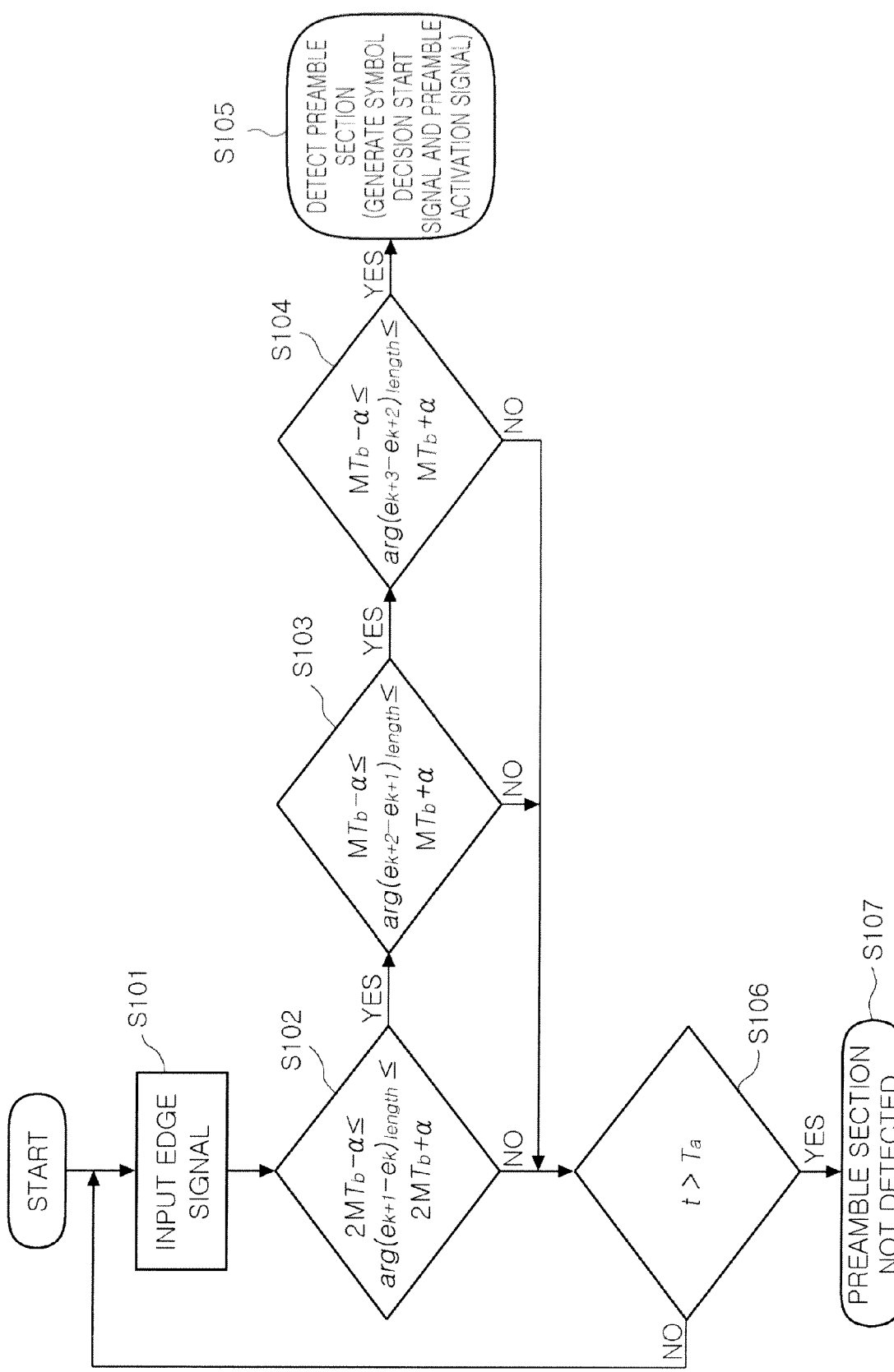
FIG. 10 is a flow chart showing a detailed process of a preamble detection step according to the embodiment of the present invention.

More specifically, the preamble detector 60 operates in accordance with an algorithm shown in FIG. 10. When the distance between the four consecutive edge clocks after time T1 defined in the ISO 18000-6C standard coincides with the distance between the symbols 1 of the '010111' data, the preamble detector 60 determines this section to be the preamble section, generates the preamble activation signal to output to a CPU (not shown), and activate the symbol decision start signal to output to the symbol decision time detector 80.

The initial symbol decision time extractor 70 extracts an initial symbol decision time by averaging the distances between the consecutive edge clocks generated in the preamble section, and provides the extracted initial symbol decision time to the symbol decision time detector 80. That is, as expressed by Equation 1 below, the four edge clocks which are consecutively generated by the symbols 1 of the '010111' data section are used to extract a unit symbol length, and the unit symbol length is set to the initial symbol decision time.

$$T_{on\_time}=(2MT'_b+MT'_b+MT'_b)/4=MT_b \qquad \text{[Equation 1]}$$

In Equation 1, $T_{on\text{-}time}$ represents the initial symbol decision time, M represents the number of unit pulses composing a unit symbol in the subcarrier signal, and $T'_b$ represents the length of the unit pulse. Furthermore, $2M'_b$ corresponds to a distance between the first and second edge clocks among the four consecutive edge clocks, and $MT'_b$ corresponds to a distance between the second and third edge clocks or between the third and fourth edge clocks. When the distances between the four consecutive edge clocks are divided by four, the unit symbol length is extracted.

The symbol decision time detector 80 is configured to set the initial symbol decision time to a symbol decision time, and continuously detect and compensate for an error of the symbol decision time.

More specifically, the symbol decision time detector 80 starts to operate in response to the symbol decision start signal provided by the preamble detector 60. First, when receiving the initial symbol decision time, the symbol decision time detector 80 sets the initial symbol decision time to a symbol decision time. Then, when the time reaches the symbol decision time, the two matched filtering signals A and B outputted from the matched filter output unit 40 are applied to the symbol decider 90. Then, the symbol decider 90 compares the magnitudes of the two matched filtering signals A and B inputted in accordance with the control of the symbol decision time detector 80, and decides a symbol.

When the symbol decider 90 first decides a symbol by using the initial symbol decision time, the symbol may be decided by considering a filter delay time (shown in FIG. 7) caused by the matched filter output unit 40. That is, the first symbol decision is performed by subtracting the filter delay time from the initial symbol decision time.

Figure 11:
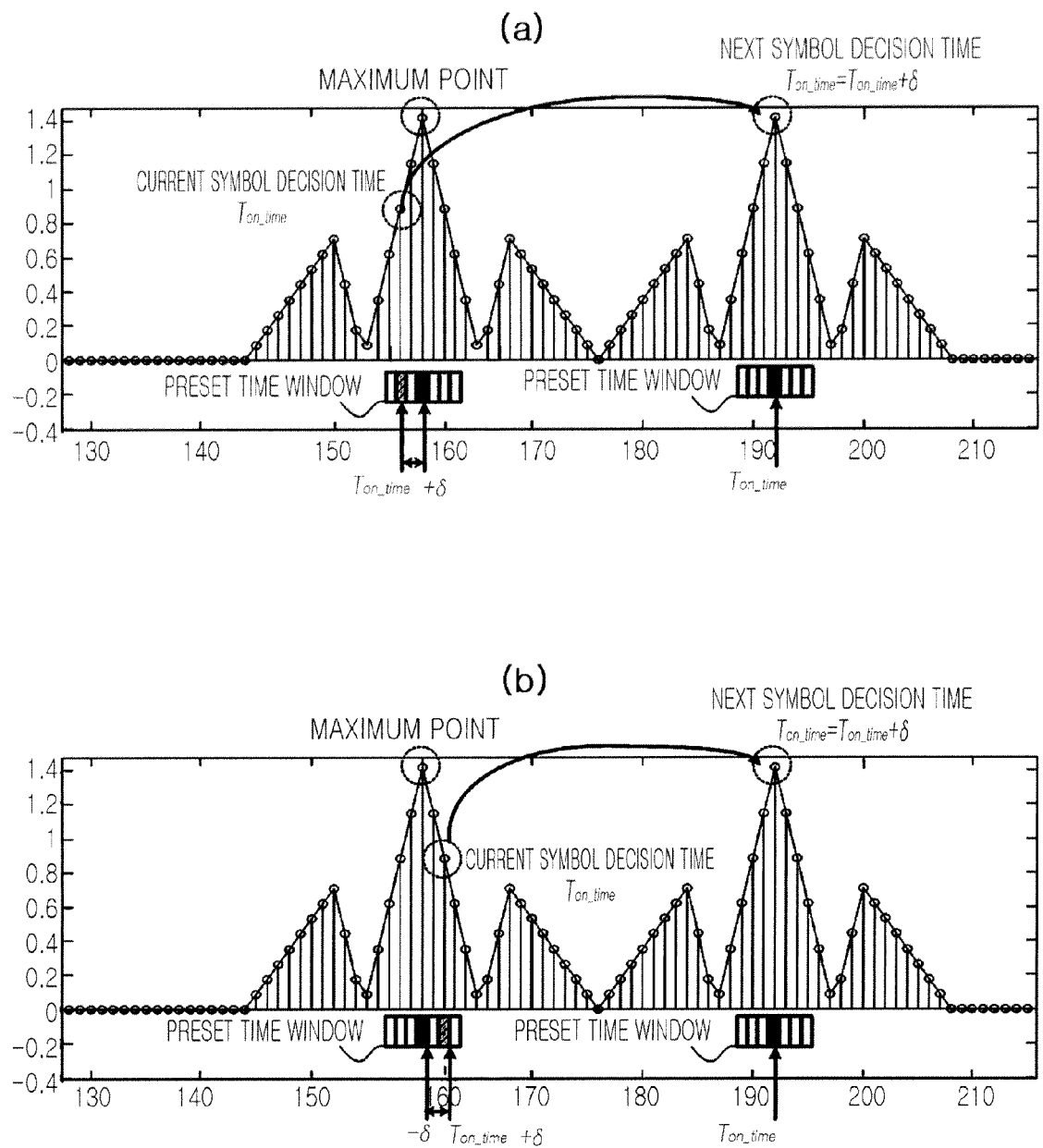
FIG. 11 is a diagram conceptually explaining that a symbol decision time is adaptively tracked in a symbol decision time tracking step according to the embodiment of the present invention.

After that, the symbol decision time detector 80 detects and compensates for an error of the current symbol decision time to set the next symbol decision time. Such an operation of the symbol decision time detector 80 may be performed as shown in FIG. 11. That is, a maximum point of the matched filtering signal is searched for within a preset time window section to detect a time difference δ between the time at the maximum point and the current symbol decision time, and the symbol decision start point is adaptively tracked by adding or subtracting the detected time difference δ to or from the next symbol decision time.

Figure 8:
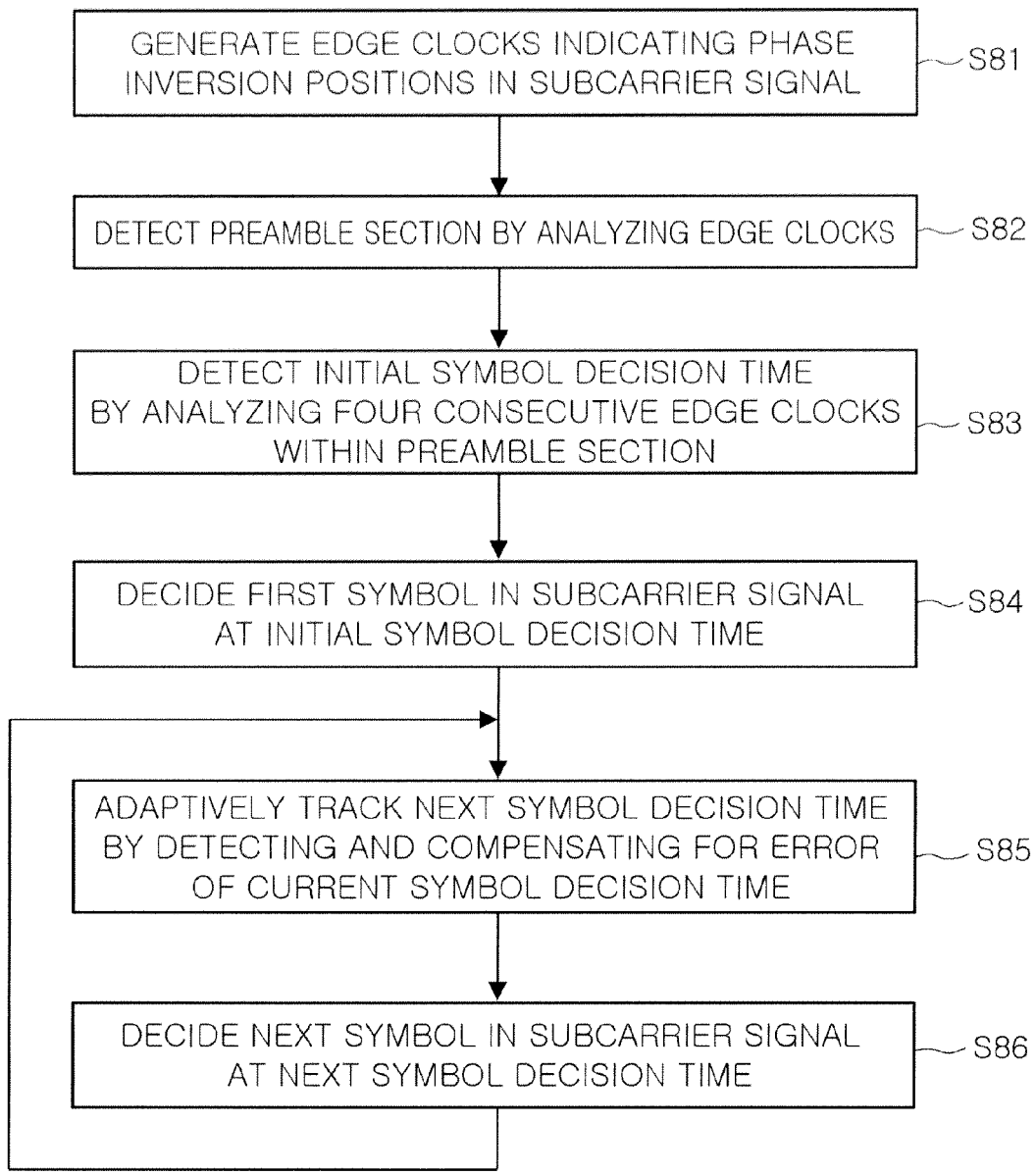
FIG. 8 is a flow chart showing a symbol synchronization method of a passive RFID reader according to another embodiment of the present invention.

FIG. 8 is a flow chart showing a symbol synchronization method of a passive RFID reader according to another embodiment of the present invention.

Referring to FIG. 8, the symbol synchronization method of the passive RFID reader according to the embodiment of the present invention includes an edge clock generation step S81, a preamble section detection step S82, an initial symbol decision time detection step S83, a first symbol decision step S84, a next symbol decision time tracking step S85, and a next symbol decision step S86.

Hereinafter, the respective steps will be described in detail.

In the edge clock generation step S81, edge clocks indicating phase inversion positions of a subcarrier signal are generated. That is, to detect the '010111' data from the preamble signal as shown in FIG. 2, the phase inversion position of the subcarrier signal, which occurs whenever the symbol 1 is inputted, is detected to generate an edge clock.

In the preamble detection step S82, the generated edge clocks are analyzed to detect a preamble section. That is, the preamble section is detected by detecting the '010111' data from the preamble signal. To check whether the edge clocks correspond to the '010111' data or not, distances between four consecutive edge clocks among the generated edge clocks are calculated. When the distances correspond to the distances between the symbols 1 of the '010111' data, this section is determined to be the preamble section.

In the initial symbol decision time detection step S83, the four consecutive edge clocks are analyzed to detect an initial symbol decision time for deciding a first symbol from a received RFID tag signal. The initial symbol decision time is detected by using the four edge clocks identified as the '010111' data of the preamble signal. More specifically, the distances between the four consecutive edge clocks are averaged by Equation 1 to detect the initial symbol decision time.

In the symbol decision step S84, the detected initial symbol decision time is set to a current symbol decision time. When the time reaches the current symbol decision time, a first symbol is decided by comparing the magnitudes of a symbol 0 matched filtering signal and a symbol 1 matched filtering signal contained in the subcarrier signal.

In the next symbol decision time tracking step S85, an error of the current symbol decision time is detected and compensated for to adaptively track the next symbol decision time. More specifically, a time difference between the current symbol decision time and the maximum point of the matched filtering signal is calculated within a preset time window section, and the next symbol decision time is compensated for as much as the time difference. This will be described below in greater detail.

In the next symbol decision step S86, when the next symbol decision time has been reached, the next symbol is decided by comparing the magnitudes of the symbol 0 matched filtering signal and the symbol 1 matched filtering signal contained in the subcarrier signal.

When the next symbol decision step S86 is completed, the process returns to the next symbol decision time tracking step S85 to repetitively perform the next symbol decision time tracking and the symbol decision.

Figure 9:
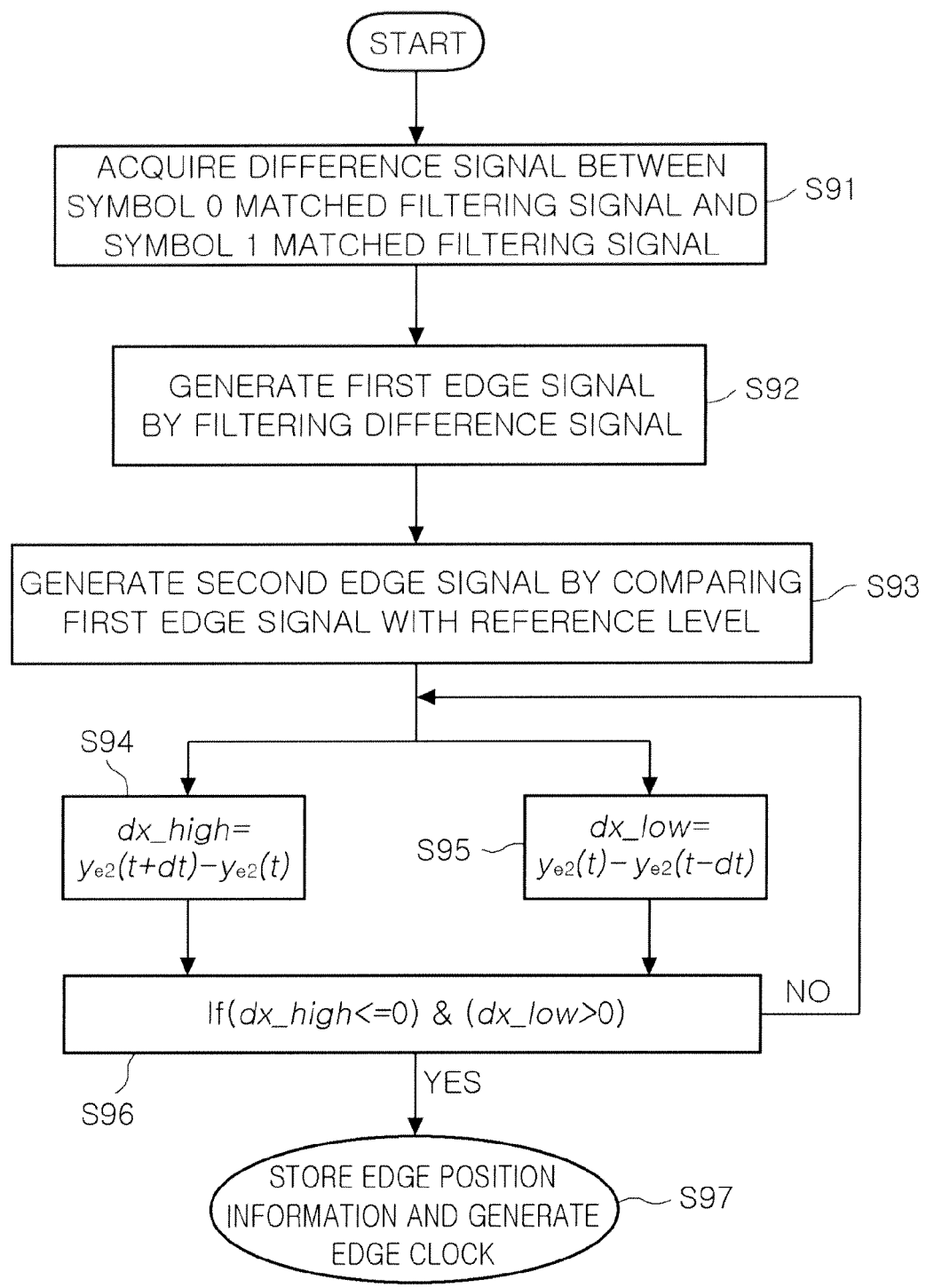
FIG. 9 is a flow chart showing the detailed process of an edge clock generation step according to the embodiment of the present invention.

FIG. 9 is a flow chart showing the detailed process of the edge clock generation step S81 according to the embodiment of the present invention.

Referring to FIG. 9, the edge clock generation step 381 is performed as follows. First, the symbol 0 matched filter signal and the symbol 1 matched filter signal are generated from the subcarrier signal, and a difference signal between them is acquired in step S91.

Then, the difference signal is filtered to generate a first edge signal in step S92, and the first edge signal is compared with a reference level in step 393. When the first edge signal is larger than the reference level, the first edge signal is outputted as it is. When the first edge signal is smaller than the reference level, a second edge signal $y_{e2}(t)$ which is to be converted into zero is generated.

When the second edge signal $y_{e2}(t)$ is generated, the edge clock detector 50 (in particular, the edge information detector 64) calculates a difference dx_low between the second edge signal $y_{e2}(t)$ and a second edge signal $y_{e2}(t-dt)$ preceded by a unit time dt in step S94, and calculates a difference dx_high between the second edge signal $y_{e2}(t)$ and a second edge signal $y_{e2}(t+dt)$ delayed by the unit time dt in step S95.

Subsequently, it is checked whether or not the difference dx_low is equal to or smaller than zero and the difference dx_high is larger than zero, in step S96. When two conditions are satisfied, edge information t at this time is extracted, and an edge clock is generated depending on the edge information t, in step 397.

In the embodiment of the present invention, the current value and the previous value of the second edge signal are compared to search for the maximum point of the second edge signal. When it is checked through the differences dx_low and dx_high that the condition in which the maximum point occurs, that is, the slope changes from positive to negative is satisfied, the corresponding edge information t is extracted.

If the time is sampled by an A/D converter, the unit time dt may be set to 1, 2, 3, . . . . When dt=1, it represents a previous sample value. When dt=2, it represents a sample value preceded by two samples.

As the unit time dt is set to a sample number larger than one, it is possible to remove a local peak signal, even though the local peak signal is contained in the matched filtering signal of the subcarrier signal.

FIG. 10 is a flow chart showing a detailed process of the preamble detection step S82.

Referring to FIG. 10, the preamble detection step S82 is performed as follows. First, the edge clocks indicating the phase inversion positions of the subcarrier signal are inputted in step S101. Then, it is checked in step S102 whether or not a distance arg $(e_{k+1}-e_k)_{length}$ between the first and second edge clocks among the four consecutive edge clocks is in the range of $\pm\alpha$ from $2MT_b$. Here, M represents the number of unit pulses composing a unit symbol in the subcarrier signal, $T_b$ represents the length of the unit pulse, and $\alpha$ represents a constant indicating a length margin. That is, $2MT_b$ represents the distance between the first symbol 1 and the second symbol 1 among the '010111' data of the preamble signal.

Furthermore, it is checked in step S103 whether or not a distance $\arg(e_{k+2}-e_{k+1})_{length}$ between the second and third edge clocks is in the range of $\pm\alpha$ from $MT_b$. Here, $MT_b$ represents the distance between the second symbol 1 and the third symbol 1 among the '010111' data of the preamble signal.

Then, it is checked in step S104 whether or not a distance $\arg(e_{k+3}-e_{k+2})_{length}$ between the third and fourth edge clocks is in the range of $\pm\alpha$ from $MT_b$.

When the above-described three conditions are satisfied, it is determined in step S105 that the consecutive four edge clocks correspond to the symbols 1 among the '010111' data of the preamble signal. When any one of the three conditions is not satisfied, it is determined that the consecutive four edge clocks are not the '010111' data of the preamble signal.

When it is checked in step S106 that a subcarrier signal satisfying the three conditions is not inputted until a preset time $T_a$ passes, it is determined in step S107 that a preamble section is not detected and the '010111' data of the preamble signal is not searched for. This is reported to the CPU (not shown).

FIGS. 11A and 11B are diagrams explaining the concept in which the symbol decision time is adaptively tracked in the symbol decision time tracking step S85.

Referring to FIGS. 11A and 11B, the maximum point of the matched filtering signal is searched for within a preset time window section set in a range which is not affected by a local peak, in order to calculate a difference $\delta$ between the current symbol decision time and the time at the maximum point.

When the time at which the maximum point of the matched filtering signal is searched for is larger than the current symbol decision time $T_{on\_time}$, the difference $\delta$ is added to the current symbol decision time to decide the next symbol decision time. When the time at which the maximum point of the matched filtering signal is searched for within the preset time window section is smaller than the current symbol decision time $T_{on\_time}$, the difference $\delta$ is subtracted from the current symbol decision time to decide the next symbol decision time.

When the matched filtering signal is sampled by an A/D converter, the time means a sample time.

According to the embodiment of the present invention, although a jitter occurs in a symbol of received data or a symbol decision time extracted at the initial stage is not accurate, a symbol decision time is adaptively tracked to coincide with the maximum point of a matched filtering signal. Therefore, it is possible to secure the reliability for the symbol decision.

Figure 12:
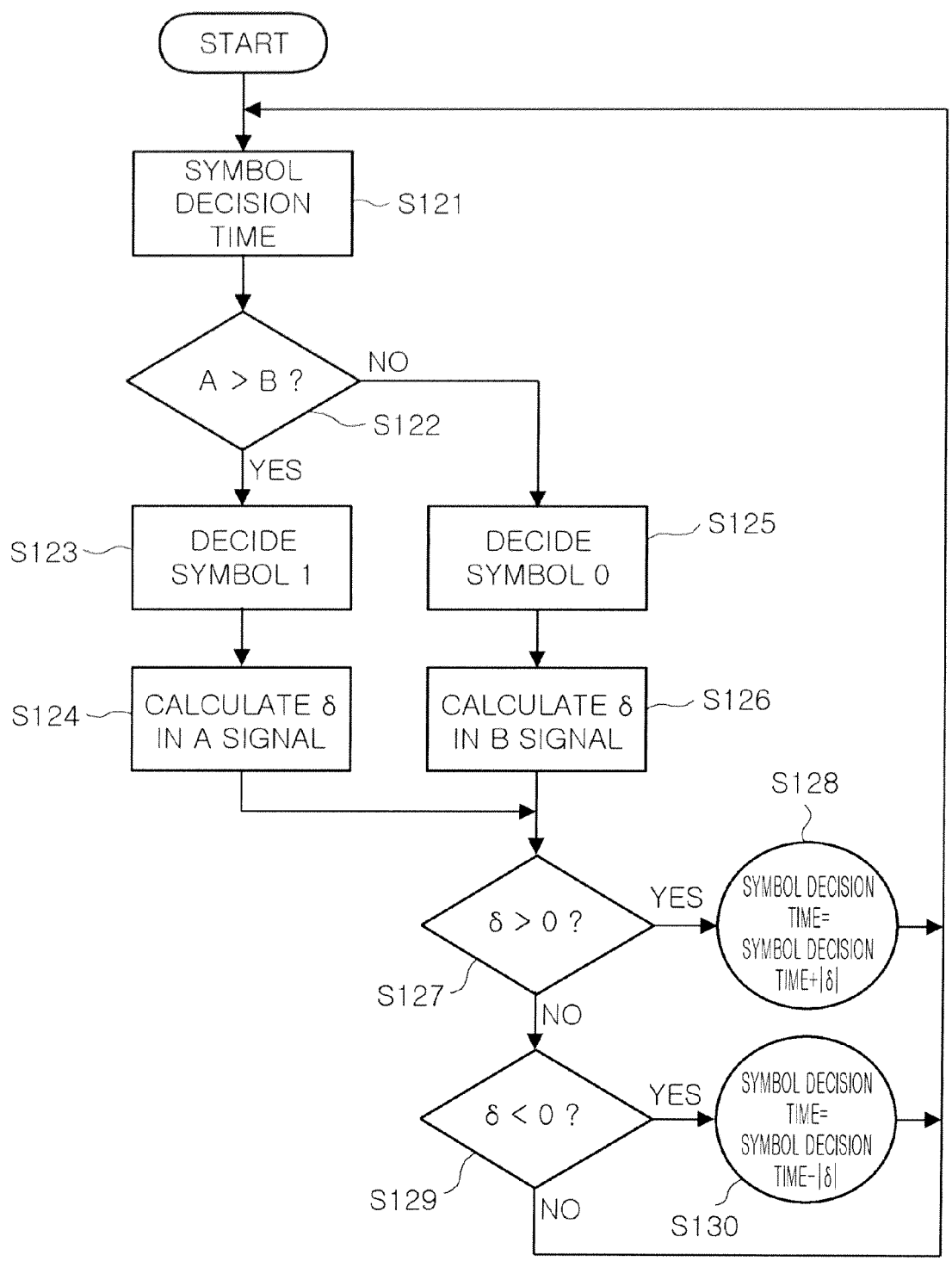
FIG. 12 is a flow chart showing a process of deciding the symbol and adaptively tracking the symbol decision time in the symbol synchronization method according to the embodiment of the present invention.

FIG. 12 is a flow chart showing the process of deciding the symbol and adaptively tracking the symbol decision time in the symbol synchronization method according to the embodiment of the present invention.

Referring to FIG. 12, it is checked in step S121 whether or not the time has reached the set symbol decision time $T_{on\_time}$ in the initial and next symbol decision steps S84 and S86, respectively. When the time reaches the symbol decision time $T_{on\_time}$, the magnitudes of the symbol 1 matched filtering signal A and the symbol 0 matched filtering signal B contained in the subcarrier signal are compared with each other in step S122.

As a result of the comparison, when the symbol 1 matched filtering signal A is larger than the symbol 0 matched filtering signal B, a symbol is determined to be the symbol 1 in step S123. Otherwise, a symbol is determined to be the symbol 0 in step S125.

In the above-described next symbol decision time tracking step S85, when the symbol 1 matched filtering signal A is larger than the symbol 0 matched filtering signal B, a time difference $\delta$ between the maximum point of the symbol 1 matched filtering signal and the current symbol decision time is calculated in step S124. When the symbol 1 matched filtering signal A is equal to or smaller than the symbol 0 matched filtering signal B, a time difference $\delta$ between the maximum point of the symbol 0 matched filtering signal and the current symbol decision time is calculated in step S126.

When it is checked in step S127 that the time difference $\delta$ is positive, the absolute value of the time difference is added to the current symbol decision time to set the next symbol decision time in step S128. When it is checked in step S129 that the time difference $\delta$ is negative, the absolute value $|\delta|$ of the time difference is subtracted from the current symbol decision time to set the next symbol decision time in step S130. When the time difference $\delta$ is zero, the next symbol decision time is set to the same value as the current symbol decision time.

In the symbol synchronization apparatus and method according to the embodiments of the present invention, the 4M/LF data of a preamble signal which may be distorted or lost by a transmission leakage signal is not used, but the '010111' data is used. Furthermore, a symbol decision start time is extracted by using the edge information of the '010111' data. Therefore, although a local peak signal is contained in a matched filtering signal for a subcarrier signal, the symbol synchronization operation may be normally performed. That is, although distortion noise caused by the transmission leakage signal or the like is contained in a tag signal received through an antenna or a local peak signal is contained in a matched filtering signal for a subcarrier signal, the tag signal may be successfully recovered.

Furthermore, the symbol decision is performed while adaptively tracking the symbol decision time which may change at any time depending on the operation environment of the RFID reader. Therefore, it is possible to further increase the reliability of the symbol synchronization operation.

While the present invention has been shown and described in connection with the exemplary embodiments, it will be apparent to those skilled in the art that modifications and variations can be made without departing from the spirit and scope of the invention as defined by the appended claims.

What is claimed is:

1. A symbol synchronization apparatus of a passive radio frequency identification (RFID) reader that transmits energy to a passive RFID tag, the apparatus comprising: an edge clock detector configured to generate edge clocks by detecting phase inversion positions of a received signal; a preamble detector configured to determine a section of the received signal is a preamble section of the received signal by analyzing the generation times of the edge clocks, wherein the preamble section includes a first portion that is distorted by the passive RFID reader's transmitted energy, and a second binary pattern portion; a symbol decision time extractor configured to extract a symbol decision time by averaging distances between the edge clocks consecutively generated in the second binary pattern portion of the preamble section and not using the first portion of the preamble section when the preamble section is detected; and a symbol decider configured to decide a symbol by analyzing magnitudes of the received signal when the time reaches the symbol decision time, wherein the received signal comprises a symbol 0 matched filtering signal and a symbol 1 matched filtering signal, and wherein the symbol decider decides a symbol by comparing the magnitudes of the symbol 0 matched filtering signal and the symbol 1 matched filtering signal contained in the received signal.

2. The symbol synchronization apparatus of claim 1, wherein the edge clock detector comprises: a subtractor configured to output a difference signal between the symbol 0 matched filtering signal and the symbol 1 matched filtering signal contained in the received signal; a low-pass filter configured to filter the output signal of the subtractor to output a first edge signal; a level decider configured to compare the first edge signal with a reference level to output a second edge signal; and an edge information extractor configured to detect the phase inversion positions of the second edge signal to output the edge clocks.

3. The symbol synchronization apparatus of claim 2, wherein the edge information extractor detects a position at which the slope of the second edge signal changes from positive to negative, and generates an edge clock at the position.

4. The symbol synchronization apparatus of claim 1, wherein the preamble detector calculates distances between the consecutive edge clocks through the edge clock detector, detects the occurrence of the preamble section when the distances coincide with distances between symbols 1 of 010111 data within the preamble signal, and generates a preamble activation signal and a symbol decision start signal.

5. The symbol synchronization apparatus of claim 4, wherein the symbol decision time extractor comprises: an initial symbol decision time extractor configured to extract an initial symbol decision time by averaging the distances between the consecutive edge clocks generated in the preamble section when the preamble activation signal is inputted; and a symbol decision time detector configured to set the initial symbol decision time to the symbol decision time when the symbol decision start signal is inputted, and then continuously detecting and compensating for an error of the symbol decision time.

6. The symbol synchronization apparatus of claim 5, wherein the initial symbol decision time extractor extracts the initial symbol decision time in accordance with an expression of Ton—time=(2MT'b+MT'b+MT'b)/4=MTb, where Ton—time represents the initial symbol decision time, M represents the number of unit pulses composing a unit symbol in a subcarrier signal, T'b represents the length of the unit pulse, 2MT'b represents a distance between the first and second edge clocks among the four consecutive edge clocks, and MT'b represents a distance between the second and third edge clocks or the third and fourth edge clocks.

7. The symbol synchronization apparatus of claim 5, wherein the symbol decision time detector detects a time difference between the symbol decision time and the maximum point of the received signal within a preset time window section, and compensates for the symbol decision time by adding or subtracting the detected time difference.

8. The symbol synchronization apparatus of claim 1, further comprising: a carrier signal I/Q (In-Phase/Quadrature) channel demodulator configured to demodulate I-channel and Q-channel analog signals of a subcarrier signal received through an antenna; I-channel and Q-channel analog-to-digital (A/D) converters configured to quantize the I-channel and Q-channel analog signals into digital signals; and a matched filter output unit configured to filter the quantized I-channel and Q-channel signals to generate the received signal.

9. A symbol synchronization method of a passive radio frequency identification (RFID) reader that transmits energy to a passive RFID tag, the method comprising: generating edge clocks by detecting phase inversion positions of a received signal; determining a section of the received signal is a preamble section of the received signal by analyzing the generation times of the edge clocks, wherein a detected preamble section includes a first portion that is distorted by the passive RFID reader's transmitted energy, and a second binary pattern portion; when the preamble section is detected, extracting a symbol decision time by averaging distances between the edge clocks consecutively generated in the second binary pattern portion of the preamble section and not using the first portion of the preamble section; and when the time reaches the symbol decision time, deciding a symbol by analyzing magnitudes of the received signal, wherein the received signal comprises a symbol 0 matched filtering signal and a symbol 1 matched filtering signal, and wherein the generating of the edge clocks comprises: outputting a difference signal between the symbol 0 matched filtering signal and the symbol 1 matched filtering signal contained in the received signal; generating a first edge signal by filtering the difference signal, and generating a second edge signal by comparing the first edge signal with a reference level; and generating the edge clocks by detecting the phase inversion positions of the second edge signal.

10. The symbol synchronization method of claim 9, wherein the generating of the edge clocks by detecting the phase inversion positions of the second edge signal comprises: receiving the second edge signal; calculating a difference between the received second edge signal and a second edge signal preceded by a unit time and a difference between the receive second edge signal and the second edge signal delayed by the unit time; and generating the edge clocks when the difference between the received second edge signal and the second edge signal preceded by the unit time is equal to or smaller than zero and the difference between the receive second edge signal and the second edge signal delayed by the unit time is larger than zero.

11. The symbol synchronization method of claim 9, wherein, in the detecting of the preamble section, the distances between the consecutive edge are calculated, and when the distances coincides with the distances between the symbols 1 contained in the preamble section, the section is determined to be the preamble section.

12. The symbol synchronization method of claim 9, wherein the extracting of the symbol decision time comprises:
   extracting an initial symbol decision time by averaging the distances between the consecutive edge clocks generated in the preamble section; and
   setting the initial symbol decision time to the symbol decision time.

13. The symbol synchronization method of claim 12, wherein the extracting of the symbol decision time further comprises detecting a time difference between the symbol decision time and the maximum point of the received signal within a preset time window section, and compensating for the symbol decision time by adding or subtracting the detected time difference.

\* \* \* \* \*